United States Patent Office 2,870,408
Patented Jan. 20, 1959

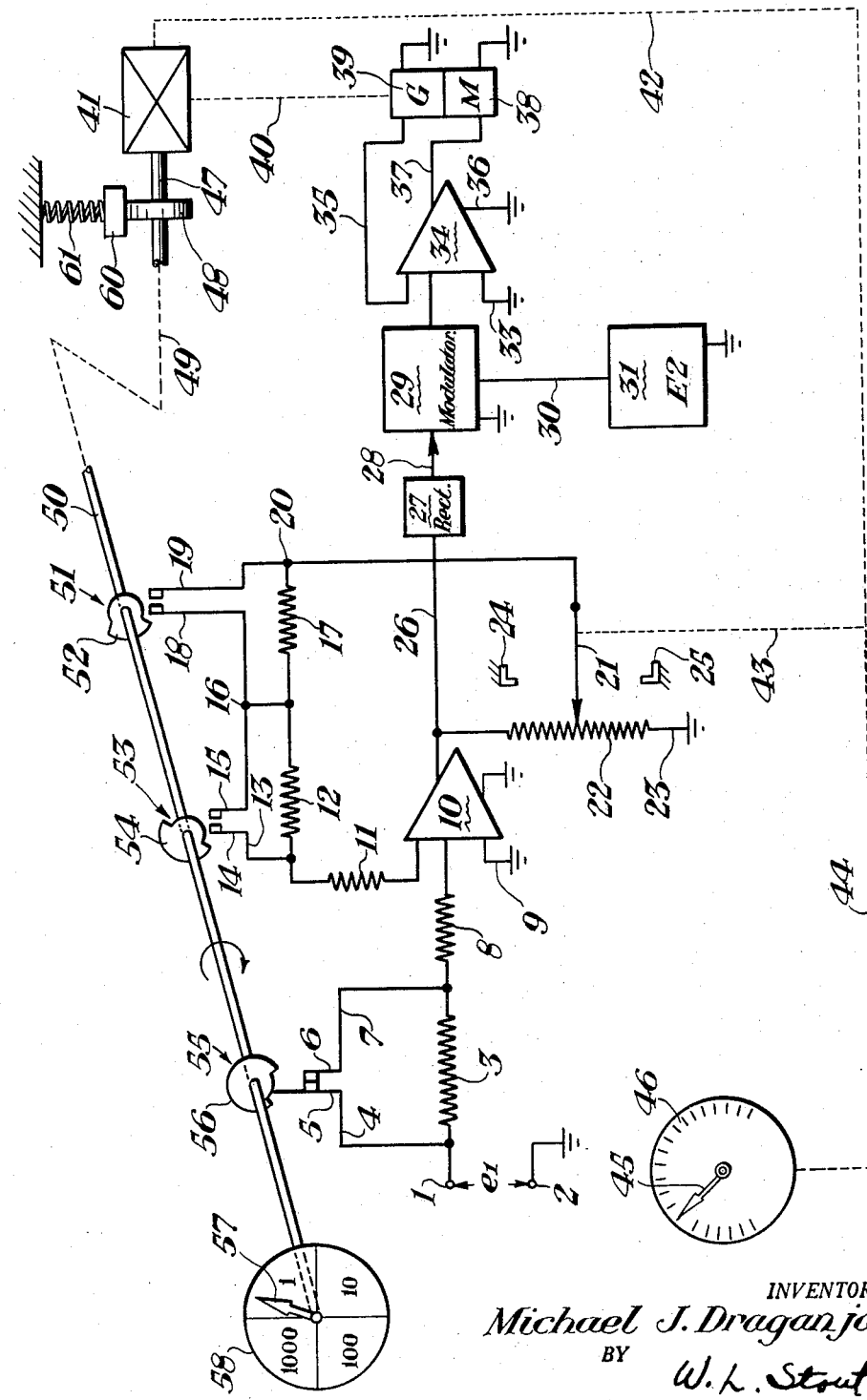

2,870,408

PRECISE AUTOMATIC MULTIRANGE INDICATING VOLTMETER AND/OR RATIOMETER

Michael J. Draganjac, Etna, Pa., assignor to Westinghouse Air Brake Company, Wilmerding, Pa., a corporation of Pennsylvania Application April 25, 1955, Serial No. 503,764

11 Claims. (Cl. 324—115)

This invention relates to the measurement and indication of electrical values, particularly to the measurement and indication of alternating electrical voltages.

It is known to measure and indicate electrical voltages by means of a servo-mechanism controlled by the relationship between the voltage to be measured and a standard or reference voltage. Such a system in which the value of the voltage to be measured is indicated as its ratio to the reference voltage is shown and described in copending application Serial No. 499,637, filed April 6, 1955, by William L. Konrad and assigned to the assignee of the present application. While such a system is perfectly satisfactory for the measurement of voltages which are not greatly different in magnitude from the available reference voltage, it is frequently necessary to measure voltages which are quite different in magnitude from that of the reference. Formerly, it was necessary to provide a series of range resistors and manual controls therefor, thus increasing the number of external controls on the instrument and making its operation more complex. The present invention provides a voltmeter or ratiometer in which compensation for range is made automatically upon connecting the test voltage input to the instrument.

Accordingly, it is an object of this invention to provide a servomotor actuated voltmeter having a plurality of ranges in which the proper range for the voltage to be measured is automatically selected.

It is a further object of this invention to provide a servo ratiometer in which the proper voltage range is automatically selected.

It is a further object of this invention to provide a servo ratiometer or voltmeter of the class described in which the value of the voltage to be measured is indicated in the form of its ratio to a standard or reference voltage, and in which a further indication is provided of the factor by which the indicated ratio must be multiplied to indicate its magnitude.

It is a further object of this invention to provide a servomechanism for indicating a characteristic of an applied voltage in which the input gain of the system is automatically adjusted to be within range of the reference voltage.

It is a further object of this invention to provide an indicating voltmeter or ratiometer for alternating voltages having automatic reversible range stepping means.

It is a further object of the invention to provide a device of the class described adapted to measure alternating voltages over a wide range of frequencies.

It is a further object of the invention to provide a control system for positioning a servomotor in accordance with a signal having wide band characteristics.

Other objects and further advantages of the invention will appear as the description proceeds.

I will first describe two embodiments of my invention, and will then particularly point out the novel features of the invention in claims.

The sole figure of the drawing comprises a schematic diagram of one embodiment of the invention.

As shown in the drawing, input terminals 1 and 2 are provided to which the voltage to be measured is applied. This voltage may be alternating at a fixed frequency and may vary greatly in magnitude. In the condition shown, this voltage is applied to amplifier 10 through lead 4, contacts 5 and 6, lead 7 and summing resistor 8. Amplifier 10 may be of any conventional type, and need not be described in detail. The amplifier has a second input terminal 9 which is grounded and an output terminal connected to potentiometer 22 which is grounded at 23. A degenerative feed-back loop is provided, comprising wiper 21 moving across potentiometer 22, terminal 20, range resistance 17, range resistance 12, and summing resistance 11 which is connected to the input of the amplifier. Since the rebalancing voltage is developed in the amplifier output, which includes the frequency components of the input, the system has a wide band response and may be used over a large range of frequencies. Output terminal 26 of amplifier 10 is connected to rectifier 27 and the rectified output voltage is connected by lead 28 to a modulator 29.

A reference voltage $E_2$ is generated in a source 31 and conducted by lead 30 to be compared to the output of rectifier 27 in modulator 29. Source 31 may be a standard source of D. C. potential of fixed value, where the instrument is to be used as a voltmeter, or it may be an alternating voltage of the frequency of the voltage to be measured, where the instrument is to be used as a ratiometer. In the latter case, a stage of rectification will be provided between source 31 and the modulator.

The output of modulator 29 is conducted to the input of amplifier 34. Amplifier 34 may be a conventional motor control amplifier of the phase discriminator type, and since such amplifiers are conventional and well known, it will not be further described. Output lead 37 of amplifier 34 is connected to a conventional servo motor 38, which may be a two-phase motor of known construction. The motor drives the input of differential gear 41 through a shaft indicated schematically at 40, and also drives a rate feed-back generator 39. Generator 39 is employed to produce a degenerative rate feed-back input to amplifier 34 by means of lead 35.

Mechanical differential gear 41 has an output indicated schematically at 42 which drives both the wiper 21 of potentiometer 22 through branch 43, and indicator needle 45 of indicator 46 through branch 44. The mechanical connections employed may comprise conventional shafts and gearing or levers, the details of construction of which do not form a part of the instant invention. Indicator 46 is graduated in terms of voltage magnitude, in cases where the instrument is to be used as a voltmeter, and is graduated in terms of the ratio of the voltage to be measured to the reference source, where the instrument is to be used as a ratiometer. However, if desired both scales could be placed on the face of the indicator for alternate use.

A second output shaft 47 from differential 41 is provided with a friction clutch shown schematically as a disc 48 mounted on shaft 47, a block 60 of a material having a relatively high coefficient of friction bearing on the periphery of the disc, and a spring 61 urging block 60 into engagement with the disc. Shaft 47 is connected to drive, or it may be coterminous with, shaft 50. The driving relationship between shaft 47 and shaft 50 is indicated schematically by dashed line 49, which is inserted merely to permit shaft 50 with its associated cams to be shown in perspective.

Shaft 50 has mounted thereon three cams, 51, 53 and 55. Cam 51 has a raised portion 52 occupying 90° of its circumference. Cam 53 has a raised portion 54 occupying 180° of its circumference. Cam 55 has a raised portion 56 occupying 270° of its circumference.

Each cam operates switches indicated schematically as opposed resilient contacts, contacts 18 and 19 being operated to a closed position by the raised portion 52 of cam 51, contacts 14 and 15 being operated to a closed position by raised portion 54 of cam 53, and contacts 5 and 6 being operated to an opened position by the raised portion 56 of cam 55. These contacts control the insertion of range resistances 3, 12 and 17 in a manner to be hereinafter described.

Shaft 50 also drives a multiplier indicator shown schematically at 58. As shown, the indicator comprises a needle 57 attached to shaft 50, and a dial 58 graduated in quadrants which correspond to the multiplier associated with the range in use. It should be understood that indicator 58 is shown schematically, and in practice any suitable indicator known to those skilled in the art could be employed for this purpose.

As will be apparent to those skilled in the art, the gain of amplifier 10 is a function of the ratio between the resistance included in the feed-back loop and the resistance in the input circuit. The resistance in the feed-back loop comprises summing resistor 11 and range resistors 12 and 17. The resistance in the input loop comprises summing resistor 8 and range resistor 3. Accordingly, by shunting one or more of these resistors, the range of the instrument can be changed. Of course, the number and position of the range resistors shown is merely illustrative, since in practice any desired number of range resistors could be provided either in the input loop or the feed-back loop, or both.

For example, if it was desired to employ a different number $n$ of range impedances, 360° would be divided by $(n+1)$, and the cams on shaft 50 would be formed with raised portions over arcs of their circumferences corresponding to successive multiples of the angle so found.

It will be noted that mechanical stops 24 and 25 are provided at the extremes of movement of wiper 21. Within the range of movement permitted by these stops, wiper 21 moves relatively freely. Similarly, indicator needle 45 has relatively little resistance to movement over its range of operation. Therefore, output shaft 42 of differential 41 has relatively little resistance to movement, whereas output shaft 47 has relatively greater resistance to movement by virtue of the resistance interposed by friction clutch 48, 60. Accordingly, shaft 47 will not rotate while wiper 21 is within the range of movement permitted by stops 24 and 25. However, when wiper 21 engages one of the stops, clutch 48 will slip and permit shaft 50 to rotate. Thereafter, the range resistors are shunted in or out of the circuit in a sequence to be described.

Shaft 50 rotates in the direction indicated by the arrow when passing from a lower to a higher range. For 90° of this movement, none of the raised portions of cams 51, 53 and 55 engage their respective contacts. After 90° of rotation on shaft 50, raised portion 56 of cam 55 engages contact 5 and urges it out of engagement with contact 6. This connects range resistor 3 into the amplifier input circuit. At this point, indicator needle 57 moves from the quadrant marked 1 to the quadrant marked 10. After shaft 50 has rotated 180°, the raised portion 54 of cam 53 closes contacts 14 and 15, shunting range resistor 12 by means of lead 13 and the connection of contact 15 to terminal 16 which is connected to the opposite terminal of resistor 12. At this point needle 57 moves from the quadrant marked 10 into the quadrant marked 100. After shaft 50 is rotated 270°, raised portion 52 of cam 51 closes contacts 18 and 19, shunting range resistor 17 out of the feed-back loop. At the 270° position of shaft 50, needle 57 moves from the quadrant marked 100 into the quadrant marked 1000. The reverse operation occurs when passing from higher to lower ranges.

In order to follow the operation of the disclosed system, assume that an input voltage $E_1$ of the highest magnitude to be measured is applied to input terminals 1 and 2. It is further assumed that all of the range switches are in the condition shown and that shaft 50 is in the position shown.

The input voltage applied through resistor 8 will unbalance amplifier 10 and a voltage output will appear across potentiometer 22. This voltage is rectified in rectifier 27 and compared with the standard voltage $E_2$ in modulator 29, where the difference is transformed into an A. C. signal for amplifier 34. Amplifier 34 will be unbalanced by the resulting signal and will produce an operating signal at lead 37 for servo motor 38. Motor 38 will rotate at a speed and in a direction determined by the magnitude and phase of the input signal, and of the rate voltage developed on lead 35 by generator 39. Shaft 40 will operate the input of differential 41, and shaft 42 will rotate. Wiper 21 will be moved along potentiometer 22 by connection 43, toward stop 24.

Since the input voltage has been assumed to be large, the full movement of wiper 21 will be incapable of providing sufficient feedback to reduce the amplifier output to a value equal and opposite to that of standard voltage source 31. Therefore, motor 38 will continue to run and wiper 21 will engage stop 24. At this point clutch 48 will begin to slip and shaft 50 will be rotated through 90°. Needle 57 will move into the quadrant marked 10, showing that the value indicated by needle 45 is to be multiplied by 10, and the raised portion 56 of cam 55 will engage contact 5 and disengage it from contact 6, placing resistance 3 in the input circuit and reducing the value of the input potential to amplifier 10. Assuming that amplifier 34 is still not balanced, shaft 50 will rotate another 90°, moving needle 57 into the quadrant marked 100, and raised portion 54 of cam 53 will close contacts 14 and 15 to shunt out feed-back resistance 12, decreasing the overall gain of amplifier 10 and reducing the signal to modulator 29. If the amplifier still is not balanced, shaft 50 will rotate a further 90°, moving needle 57 into the quadrant marked 1000, and raised portion 52 of cam 51 will close contacts 18 and 19 to shunt out feed-back resistance 17. At this point, the gain of amplifier 10 is at its lowest value, and with wiper 21 at the extreme of its movement against stop 24, the maximum negative feed-back voltage is applied to amplifier 10. Accordingly, if the input voltage is within the range of the instrument, wiper 21 will begin to move down along resistor 22 until the voltage on lead 26 is just sufficient to balance reference voltage $E_2$ in modulator 29. At this point, amplifier 34 will be balanced and motor 38 will stop. Needle 45 will indicate the absolute value of the input voltage, and needle 57 will indicate the value by which this indication must be multiplied to give the true magnitude of the input.

When operating the instrument as a ratiometer, an alternating voltage of the frequency of that to be measured is applied at source 31, and a suitable rectifier is provided to transform this reference voltage into an input suitable for application to modulator 29. The previously described balancing operation will take place, but in this case the indication of needle 45 will be of the ratio of the input voltage to the reference alternating voltage, and multiplier indicator 58 will show the value by which this ratio must be multiplied to give the magnitude of the ratio.

While I have described two embodiments of my invention in detail, it should be understood that the embodiments shown are merely illustrative of the forms which my invention may take. Numerous changes and modifications within the scope of the invention will be apparent to those skilled in the art after reading this disclosure. Accordingly, the invention should not be considered to be limited to the details shown, but is of the scope of the following claims.

Having thus described my invention, what I claim is:
1. A motor control system, comprising, in combina- tion, a summing circuit having a pair of input terminals and an output terminal, one of said input terminals being adapted to be connected to a source of alternating signal voltage, an amplifier connected to said output terminal, resistance means connected across the output of said amplifier, a wiper adjustable along said resistance means, the other of said input terminals being connected to said wiper, a source of unidirectional reference potential, rectifying means connected across said resistance means for producing a unidirectional voltage in accordance with said signal voltage, a servomotor drivably connected to said wiper, and control means for said servomotor responsive to the difference between said reference potential and said unidirectional voltage.

2. Apparatus of the class described, comprising, in combination, a servomotor, control means for said servomotor including an amplifier, said amplifier having an input circuit adapted to be connected to a source of unknown voltage and a feed-back circuit including a variable impedance, a plurality of range setting impedances for said circuits, switching means for sequentially connecting said impedances in said circuits, a differential driven by said servomotor, said differential having a first output connected to adjust said variable impedance, a second output for said differential having greater resistance to movement than said first output, means connecting said second output to said switching means, and limit stop means for said first output whereby said switching means are actuated after a predetermined movement of said servomotor.

3. Voltage measuring apparatus comprising an input circuit including an amplifier adapted to be connected to a source of voltage to be measured, said amplifier having a control circuit comprising a variable gain control impedance, a plurality of fixed gain control impedances, switching means for sequentially connecting said fixed impedances in said control circuit, a source of reference voltage, voltage comparing means connected to said reference source and said amplifier, a servomotor controlled by said voltage comparing means, differential means including first and second output means and input means actuated by said servomotor, means connecting said first output means to said variable gain control impedance, stop means cooperating with said first output means to limit the range of movement thereof, clutch means for said second output means to prevent movement thereof while said first output means is within the range set by said stop means, means connecting said second output means to actuate said switching means, whereby the range of said apparatus is automatically adjusted in accordance with the magnitude of the voltage to be measured, a first indicator actuated by said first output means, and a second indicator actuated by said second output means.

4. In a multiple range indicating system, a servomotor, control means for said servomotor, said control means comprising a reference voltage source and a variable gain circuit adapted to be connected to a source of voltage to be measured, first means actuated over a predetermined range by said servomotor for continuously adjusting said variable gain circuit in accordance with movement of said servomotor within said range, an indicator controlled by said first means, second means actuated by movement of said servomotor beyond said predetermined range for adjusting said variable gain circuit in successive steps until said servomotor reverses its movement, and a multiplier indicator actuated by said second means.

5. A servo ratiometer comprising, in combination, an amplifier having an input circuit, an output circuit and a feed-back circuit, said output circuit including a potentiometer having an adjustable wiper, said feed-back circuit being connected between said wiper and a point in said input circuit, a plurality of fixed impedances in said input and feed-back circuits, switching means for shunting said impedances, a reference source of voltage, a reversible servomotor, control means for said servomotor responsive to the difference between said reference voltage and the voltage across said potentiometer, differential means having an input shaft actuated by said servomotor and having first and second output shafts, one of said output shafts being driven by said input shaft when the other output shaft is held against motion, said first output shaft being drivably connected to said wiper, stop means defining extremes of movement for said wiper and preventing movement of said first output shaft beyond a predetermined range, a ratio indicator connected to said first shaft, clutch means engaging said second shaft to yieldably prevent its motion, cam means on said second shaft for sequentially actuating said switching means to vary the gain of said amplifier when said second shaft is driven against the resistance of said clutch means after said first shaft has driven said wiper against one of said stop means, and a multiplier indicator connected to said second shaft.

6. A multiple range voltmeter comprising, in combination, an amplifier having an input circuit, an output circuit and a feed-back circuit, said output circuit including a potentiometer having an adjustable wiper, said feed-back circuit being connected between said wiper and a point in said input circuit, a plurality of fixed impedances in said input and feed-back circuits, switching means for shunting said impedances, a rectifier connected across said potentiometer, a reference source of direct voltage, a reversible servomotor, control means for said servomotor responsive to the difference between said reference voltage and the voltage at the output of said rectifier, differential means actuated by said servomotor and having first and second output shafts, one of said shafts being driven by said servomotor when the other shaft is held against motion, said first output shaft being connected to said wiper, stop means defining extremes of movement for said wiper and holding said first shaft against motion beyond said extremes, a voltage indicator connected to said first shaft, clutch means engaging said second shaft to yieldably restrain its motion, cam means on said second shaft for sequentially actuating said switching means when said second shaft is driven against the resistance of said clutch means after said wiper has engaged one of said stop means, and a multiplier indicator connected to said second shaft.

7. A motor control system, comprising, in combination, a summing circuit having a pair of input terminals and an output terminal, one of said input terminals being adapted to be connected to a source of signal voltage, an amplifier connected to said output terminal, resistance means connected across the output of said amplifier, a wiper adjustable along said resistance means, the other of said input terminals being connected to said wiper, a source of reference voltage, a servomotor drivably connected to said wiper, control means for said servomotor responsive to the difference between the reference voltage and the voltage across said resistance means, and utilization means connected to said servomotor to be operated thereby.

8. Multiple range indicating apparatus, comprising in combination, an amplifier having a feed-back path including a variable impedance and a plurality of fixed impedances, input terminals for said amplifier adapted to be connected to a source of voltage a characteristic of which is to be indicated, means for comparing the output of said amplifier with a reference voltage, a servomotor controlled by said comparing means, first movable means controlled by said servomotor for adjusting said variable impedance, second means controlled by said servomotor for sequentially shunting said fixed impedances following a predetermined movement of said first means, an indicator controlled by said first means to display a series of digits associated with said characteristic, and a second indicator controlled by said second means to display the multiplier value required to assign a magnitude to said digits.

9. A multiple range indicating system, comprising, in combination, an amplifier adapted to be connected to a source of voltage, a feed-back path for said amplifier comprising a mechanically adjustable impedance and a fixed impedance, stop means defining limits of adjustment for said adjustable impedance, means for comparing the output of said amplifier with a reference voltage, a servomotor controlled by said comparing means, first means controlled by said servomotor for adjusting said adjustable impedance, second means controlled by said stop means and said servomotor for shunting said fixed impedance, and indicator means controlled by said first and second means.

10. A multiple range indicating system, comprising, in combination, an amplifier adapted to be connected to a source of voltage through an input circuit comprising a plurality of impedances, a feed-back path for said amplifier comprising a mechanically adjustable impedance, stop means defining limits for adjustment for said adjustable impedance, means for comparing the output of said amplifier with a reference voltage, a servomotor controlled by said comparing means, first means controlled by said servomotor for adjusting said adjustable impedance, second means controlled by said stop means and said servomotor for shunting said impedances, and indicator means controlled by said first and second means.

11. A wide band voltage measuring system, comprising, in combination, an amplifier having an output circuit and an input summing circuit comprising a pair of impedances, means for connecting one of said impedances to a source of voltage to be measured, means for comparing the voltage across said output circuit with a reference voltage, a variable impedance comprising a resistor and a wiper movable thereon, servomotor means controlled by said comparing means for adjusting said wiper, means connecting said wiper to the other of said impedances, and means connecting said resistor across said output circuit whereby the voltage developed by the wiper contains the frequency components of said source and is applied to said amplifier in phase opposition to said source voltage regardless of the frequency of said source.

References Cited in the file of this patent

UNITED STATES PATENTS

| | | |
|---|---|---|
| 2,439,381 | Darlington et al. | Apr. 13, 1948 |
| 2,575,711 | Hipple et al. | Nov. 20, 1951 |
| 2,661,260 | Saltzman | Dec. 1, 1953 |
| 2,682,000 | Clayton et al. | June 22, 1954 |
| 2,682,001 | Duffy | June 22, 1954 |
| 2,691,123 | Schuck | Oct. 5, 1954 |